June 17, 1947.  L. W. BURCH  2,422,526
HEATING SYSTEM
Filed June 20, 1941  2 Sheets-Sheet 1
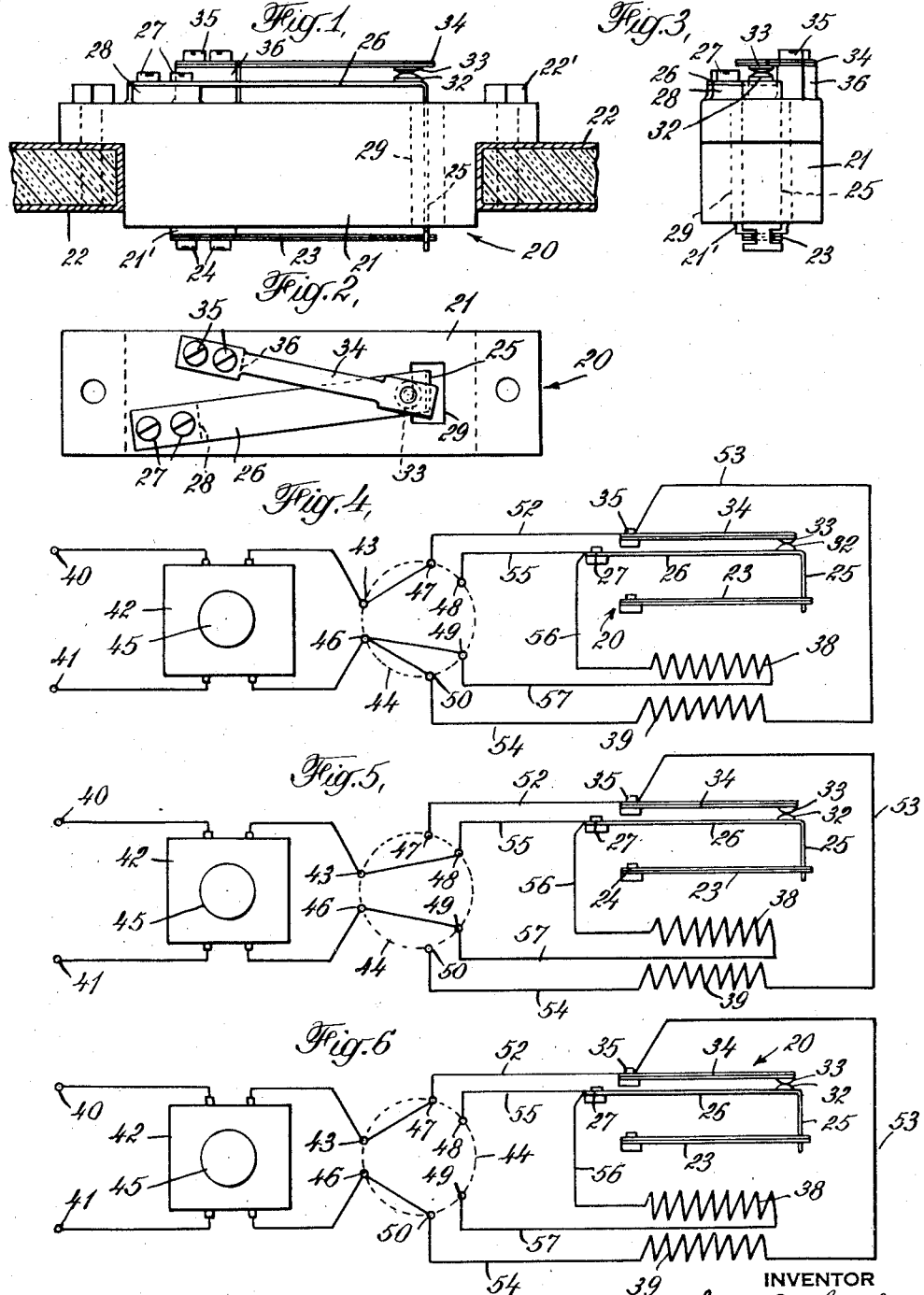
INVENTOR
Lyndon W. Burch
BY
Pennie Davis Marvin Edmonds
ATTORNEYS June 17, 1947. L. W. BURCH 2,422,526
HEATING SYSTEM
Filed June 20, 1941 2 Sheets-Sheet 2
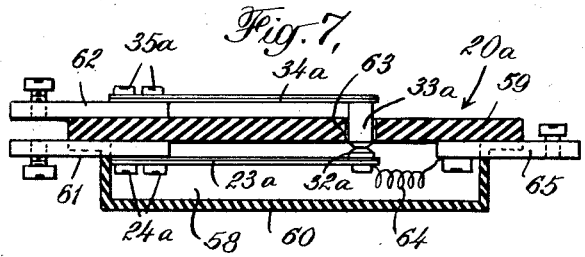
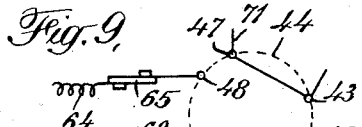
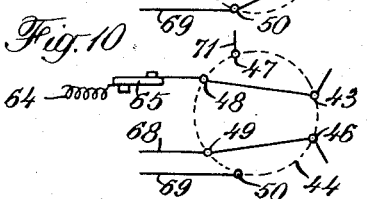
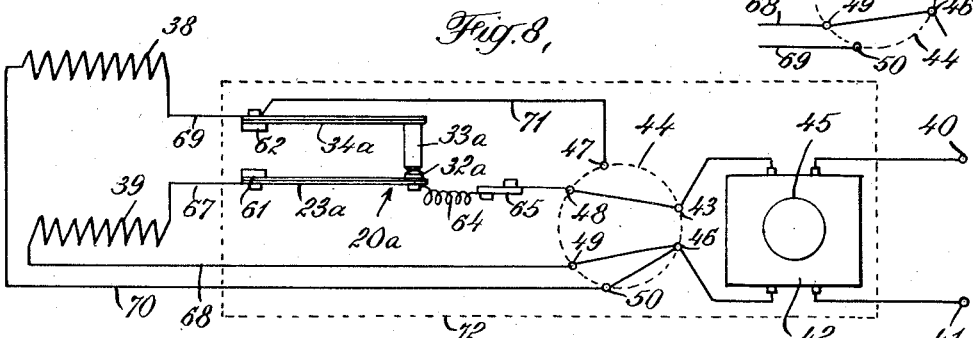
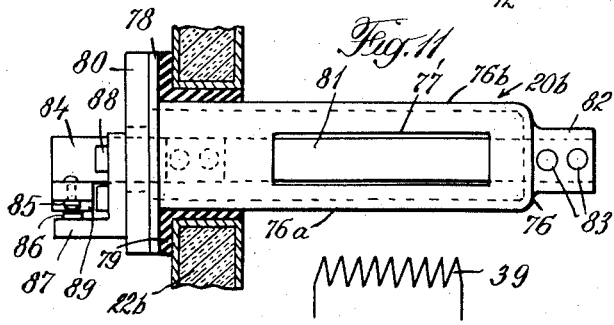
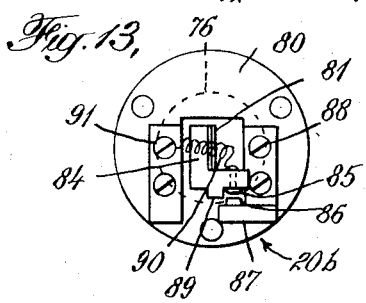
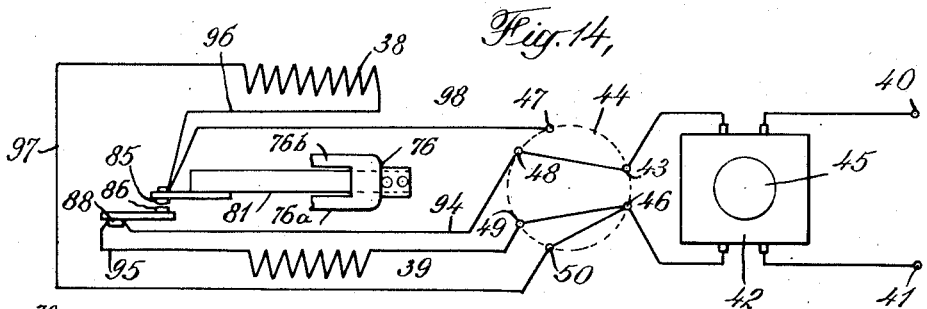
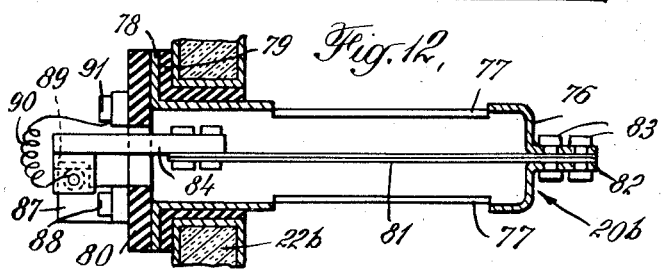
INVENTOR
Lyndon W. Burch
BY
Pennie Davis Marvin & Edmonds
ATTORNEYS Patented June 17, 1947

2,422,526

UNITED STATES PATENT OFFICE 2,422,526

HEATING SYSTEM

Lyndon Walkup Burch, Bronxville, N. Y., assignor to The Wilcolator Company, Newark, N. J., a corporation of Delaware Application June 20, 1941, Serial No. 398,920

17 Claims. (Cl. 219—20)

This invention relates to heating systems of the type in which the heating means are operated at a relatively high heating rate to heat a chamber rapidly to the desired temperature which is then maintained by the operation of the heating means at a reduced heating rate under control of a thermostat. More particularly, the invention has reference to a novel system of this type in which, after initial heating of the chamber, the connections to the heating means are changed due to the joint action of a pair of independently operating thermostats, so that the heating means are thereafter operated under thermostatic control but at a reduced heating rate to maintain the temperature.

While the heating system of my invention may be used for various purposes, it may be employed to particular advantage in electric ranges for heating the oven. Accordingly, for illustrative purposes an embodiment of the invention suitable for this use will be described and illustrated herein, although it will be understood that the invention is not limited to electric heating systems or to use in cooking ranges.

Electric ovens are generally heated by means including a broiling element near the top of the oven and a baking element near the bottom, these elements being energized through a selector switch having an "off" position in which both elements are deenergized, a "bake" position in which only the bake element is energized, and a "broil" position in which only the broil element is energized. The energizing of the heating elements through the selector switch is controlled by a regulator including an oven thermostat which may be adjusted to different temperature settings. In order to heat the oven rapidly from room temperature to a baking temperature, the selector switch is commonly provided with a fourth or "preheat" position in which the bake and broil elements are energized simultaneously. After the oven is preheated, it is usually necessary for the operator to move the selector switch manually to the "bake" position to prevent intermittent energizing of the boil element by the action of the oven thermostat during the baking operation, and it happens not infrequently that the operator forgets to move the selector switch in this manner after preheating with the result that the food is spoiled by direct radiation from the broil element.

Temperature regulators have been devised heretofore in which the broil element is automatically cut out after preheating to insure that only the baking element will be energized during the baking operation. These regulators as made heretofore, however, require some form of mechanism operated by the oven thermostat for positively locking a switch in the broil circuit in its open position out of the influence of the oven thermostat when the latter initially opens the heating circuits. Since the locking mechanism is directly associated with and operated by the oven thermostat, it is impractical to use standard types of thermostatic regulators. Moreover, the prior regulators having the locking mechanism built in them include delicate parts which are easily broken and require careful adjustment, and these regulators are relatively expensive.

One feature of the present invention, therefore, resides in the provision of a novel oven heating system in which, after the preheating cycle and during subsequent operation of the bake element under thermostatic control, the broil element is automatically cut out or substantially so by the action of a device of simple and inexpensive construction which may be associated with an oven temperature regulator of a standard type. An oven heating system made in accordance with my invention comprises baking and broiling elements in the oven and connections between these elements and a source of energy including a switch or other control means having an operative position in which the bake and broil elements are operated simultaneously and an inoperative position in which the bake element is operated alone or with only part of the broiling element capacity. The switch is controlled by a thermostat responsive to operation of the heating elements, such as a bimetallic thermostat in the broil element circuit or a radiation-responsive thermostat adjacent one of the heating elements, and when the oven is initially heated to a predetermined temperature with the switch in its operative position an independent oven thermostat disconnects the heating elements from the source so that the first thermostat causes the switch to move to its inoperative position where it is held during subsequent energizing of the bake element under control of the oven thermostat.

With this construction, the oven thermostat may be of a standard type since the switch in the broil circuit is controlled only indirectly by this thermostat through the independent control thermostat. Preferably, a selector switch is arranged between the heating elements and a switching means actuated by the oven thermostat, the selector switch having "off," "preheat," "bake" and "broil" positions. If desired, the oven thermostatic switch, the selector switch, the broil switch and its control thermostat may be included in a single unitary structure which may be mounted in any suitable position on the range.

Another feature of my invention resides in the provision of a novel heating system in which the heating means are first operated at a relatively high heating rate and then, when a predetermined temperature is attained, the heating rate is automatically decreased by the joint action of a pair of independent thermostats. The heating rate is preferably determined by the position of a suitable control means, such as a switch, and one of the thermostats, which operates in accordance with changes in the temperature adjacent the heating means, acts to move the control means to a low heat position as the temperature rises. The second thermostat is responsive to operation of the heating means independently of the temperature adjacent thereto and counteracts the initial effect on the control means of the first thermostat so as to maintain the control means in a high heat position during initial operation of the heating means. However, when the predetermined temperature is attained, the heating means are temporarily rendered inoperative, as by means of an automatic switch, with the result that the second thermostat is actuated in the opposite direction and thereby causes movement of the control means to its low heat position where it is maintained during subsequent operation of the heating means.

These and other features of the invention may be better understood by reference to the accompanying drawings, in which Fig. 1 is a side view of one form of an automatic control device of the new system;

Figs. 2 and 3 are plan and end views, respectively, of the device shown in Fig. 1;

Fig. 4 is a diagrammatic view of one form of the new heating system including the device shown in Fig. 1;

Figs. 5 and 6 are views similar to Fig. 4 but showing different connections to the heating means;

Fig. 7 is a longitudinal sectional view of a modified form of the automatic control device shown in Fig. 1;

Fig. 8 is a diagrammatic view of another form of the heating system including the device shown in Fig. 7;

Figs. 9 and 10 are diagrammatic views showing different connections in the system illustrated in Fig. 8;

Fig. 11 is a side view of still another form of the automatic control device;

Fig. 12 is a horizontal sectional view of the device shown in Fig. 11;

Fig. 13 is an end view of the device shown in Fig. 11; and

Fig. 14 is a diagrammatic view of a third form of the heating system including the device shown in Fig. 11.

Referring to the drawings, the heating system comprises an automatic control device 20 which, as shown in Figs. 1, 2 and 3, includes a base member 21 made of insulating material and secured in one wall of an oven 22 by means of screws 22', the inner part of the base being exposed to the interior of the oven. Inside the oven is a thermostat 23 preferably in the form of a strip of bimetal secured at one end to a boss 21' on the base by screws 24. The free end of the thermostat is loosely connected to a lateral extension or leg 25 on a flexible contact arm 26 secured by screws 27 to a boss 28 on the outer face of the base, the leg 25 extending inwardly from the free end of the arm through a passage 29 in the base.

A contact 32 is mounted on the free end of arm 26 outside the oven and coacts with a contact 33 on the free end of a bimetallic thermostat 34 which is secured by screws 35 to a boss 36 on the outer face of the base. The contacts 32 and 33 constitute a switch arranged to control a broiling element 38 disposed above a baking element 39 in the oven, the heating elements being energized from a suitable current source at terminals 40 and 41. Terminal 40 is connected through one pole of a thermostatic switch 42 to terminal 43 of a selector switch 44. The thermostatic switch 42 may be of any suitable construction, such as that shown in Waddell Patent No. 2,197,230, granted April 16, 1940, and is responsive to changes in the oven temperature. Preferably, the thermostatic switch is adjustable to different temperature settings by means of a handle 45. The other terminal 41 of the current source is connected through the other pole of the thermostatic switch to another terminal 46 of selector switch 44 which, as shown, includes additional terminals 47, 48, 49 and 50. Terminal 47 is connected by a wire 52 to the screw 35 of thermostat 34 which is connected by a wire 53 to one side of the bake element 39. The opposite side of the bake element is connected by a wire 54 to the terminal 50 of the selector switch. From terminal 48, a wire 55 extends to the screw 27 of contact arm 26, and a wire 56 extends from this screw to one side of the broil element 38, the other side of which is connected by wire 57 to the terminal 49.

The selector switch 44 may be of any desired construction but preferably includes a selector handle (not shown), having a "preheat" position in which both heating elements are connected through the thermostatic regulator 42 to the current source, as shown in Fig. 4, a "broil" position in which only the broil element 38 is connected through the regulator 42 to the current source, as shown in Fig. 5, and a "bake" position in which only the bake element 39 is connected to the current source through regulator 42, as shown in Fig. 6. In addition, the selector handle may have an "off" position in which switch 44 disconnects both heating elements from the current source.

The operation of the heating system is as follows: When it is desired to use the oven for baking and to preheat it rapidly to the baking temperature, the adjustment handle 45 is set to the desired temperature and selector switch 44 is manipulated to the "preheat" position. In this position of the selector switch, current from terminal 40 passes through the thermostatic switch 42, which is now closed, terminals 43 and 47, wire 52 and terminal 35 where the circuit divides, one branch passing through wire 53, bake element 39, wire 54, terminals 50 and 46, and thermostatic switch 42 to the other terminal 41 of the current source. The other branch of the current passes from terminal 35 through the bimetallic thermostat 34, contacts 33 and 32, contact arm 26, terminal 27, wire 56, broil element 38, wire 57, terminals 49 and 46, and thermostatic switch 42 to terminal 41 of the current source. Accordingly, the heating elements 38 and 39 are connected across the power line and operate simultaneously to preheat the oven rapidly to the desired temperature. During the preheating operation, the increase in the oven temperature causes thermostat 23 to flex so that its free end moves inwardly away from base 21. This movement of thermostat 23 is transmitted to contact arm 26 through the leg 25 and tends to move the broil contact 32 out of engagement with broil contact 33. However, during the preheating operation current is passing through the bimetallic thermostat 34 in the broil circuit, and due to the electrical resistance of thermostat 34 this current heats the thermostat and causes it to flex so that its free end follows the inward movement of contact 32, whereby the broil switch 32—33 is held closed. The bimetals selected for the thermostats 34 and 23 are preferably such that the rate of flexing of thermostat 34 due to the current passing through it in the broil circuit is the same as or somewhat greater than the rate of flexing of thermostat 23 due to the rise in oven temperature, whereby sufficient pressure is maintained between contacts 32 and 33 to prevent opening of the broil circuit during the preheating operation.

When the oven is heated to the temperature for which adjustment handle 45 is set, the thermostatic switch 42 opens and breaks the circuits through the heating elements 38 and 39. As a result, current ceases to flow through thermostat 34 which is then quickly cooled by the surrounding atmosphere outside the oven and moves back toward its initial position, thereby separating the contacts 32 and 33. Contact 32 cannot follow the contact 33 at this time because it is held by thermostat 23 which remains flexed under the action of the heat retained in the oven. Accordingly, when the thermostatic switch 42 closes again in response to a slight decrease in the oven temperature, the bake element 39 is re-energized through the circuit previously traced but the broil element 38 cannot be re-energized since its circuit remains broken at the broil switch 32—33. Thus, the oven temperature is thereafter maintained by intermittent energizing of the bake element 39 under control of the thermostatic switch 42 and with the broil element 38 de-energized. The broil element cannot be energized again unless and until the oven cools to approximately room temperature to permit thermostat 23 to return to its initial position and re-engage the contacts 32 and 33, as when selector switch 44 is moved to its "off" position.

In the use of the oven for broiling purposes, the selector switch 44 is moved to the "broil" position to connect terminals 43 and 46 with terminals 48 and 49, respectively, as shown in Fig. 5. Current then passes from terminal 40 through thermostatic switch 42, terminals 43 and 48, wire 55, screw 27, wire 56, broil element 38, wire 57, terminals 49 and 46, and thermostatic switch 42 to terminal 41. The bake element 39 remains de-energized because its terminal 50 is not engaged by the switching means 44, and, therefore, the broil element 38 operates alone under control of the thermostatic switch 42.

In some instances it may be desired to use the oven for baking without the preheating operation. The selector switch 44 is then moved to the "bake" position to connect terminals 43 and 46 with terminals 47 and 50, respectively, as shown in Fig. 6, whereby the bake element 39 is energized through the circuit previously traced in connection with Fig. 4. In this position of the selector switch, the broil element 38 cannot be energized because its terminal 49 is not connected to terminal 46. Accordingly, the element 39 operates alone under control of the thermostatic switch 42.

It will be observed that the control device 20 for the broil element is mounted directly on the oven wall so that its thermostat 23 is disposed in the oven. In some instances it may be desirable to arrange the control device in a location remote from the oven, as, for example, in a unitary structure including the usual thermostatic switch 42 and the selector switch 44. The control device may then take the form illustrated in Fig. 7 comprising a chamber 58 defined by a base member 59 and a cup-shaped member 60 made of insulating material. A thermostat 23a is mounted in the chamber 58 on a terminal member 61 projecting through one wall of the chamber, the thermostat being secured to the terminal by screws 24a. At its free end, the thermostat 23a carries a contact 32a coacting with a contact 33a on a bimetallic thermostat 34a mounted outside the chamber 58 on a terminal member 62, as by means of screws 35a. The thermostat 34a is adapted to flex relative to the base 59, and its contact 33a extends into the chamber 58 through a small opening 63 in the base. A heating coil 64 in the chamber is connected at one end to the contact 32a and at the opposite end to a terminal member 65 projecting through another wall of the chamber.

The heating system shown diagrammatically in Fig. 8 is generally similar to that illustrated in Figs. 4, 5 and 6 and includes the thermostatic switch 42 and selector switch 44 through which heating elements 38 and 39 are energized from the current source 40, 41. However, the control device 20a is connected so that the heat for actuating thermostat 23a is supplied by the heating unit 64 which is in circuit with bake element 39 at all times. When the selector switch 44 is moved to the "preheat" position (Fig. 8), current then passes from terminal 40 through thermostatic switch 42, terminals 43, 48 and 65, and heating resistance 64 to contact 32a where the current divides, one branch passing through thermostat 23a, terminal 61, wire 67, bake element 39, wire 68, terminals 49 and 46, and thermostatic switch 42 to the other terminal 41. The other branch of the current passes from contact 32a through contact 33a, thermostat 34a, terminal 62, wire 69, broil element 38, wire 70, terminals 50 and 46, and thermostatic switch 42 to terminal 41. The heating elements 38 and 39 are thus energized across the line 40, 41 and heat the oven rapidly to the temperature for which the adjustment handle 45 is set. During this initial heating of the oven, the resistor 64 heats the chamber 58 and causes thermostat 23a to flex downwardly, as shown in Figs. 7 and 8, thereby acting to separate contacts 32a and 33a. However, at this time current in the broil circuit is passing through thermostat 34a which is thus heated and flexes in the same direction as thermostat 23a, whereby contacts 32a and 33a are held in engagement.

When the oven is heated to the desired temperature, the thermostatic switch 42 opens and breaks the circuits through the heating elements. Due to the insulated chamber 58, the heat generated by resistance 64 is largely retained in the space surrounding thermostat 23a so that the latter remains substantially in its lower or flexed position. However, the thermostat 34a, which may be surrounded by atmosphere at room temperature, is quickly cooled when the flow of current through it is interrupted, and, therefore, this thermostat flexes back toward its initial position and separates contacts 32a and 33a. Accordingly, when the temperature in the oven decreases sufficiently to reclose the thermostatic switch 42, only the baking element 39 is energized, this element being thereafter operated intermittently under control of switch 42 to maintain the approximate temperature selected by handle 45. The broil element 38 cannot be re-energized unless and until the baking element and resistor 64 are de-energized continuously for a sufficient time interval to permit cooling of chamber 58 to approximately room temperature, whereby the thermostat 23a may flex back to its initial position and re-engage contacts 32a and 33a.

When the selector switch 44 is moved to the "broil" position (Fig. 9), the broil element 38 is energized through terminals 43 and 47, wire 71 and terminal 62, so that the heating unit 64 and broil switch 32a—33a are short circuited. The bake element 39 cannot be energized because its terminal 49 is not engaged by the switching means 44. When the selector switch is moved to the bake position (Fig. 10), the bake element 39 is energized through the bake circuit previously traced, and while the heating unit 64 is also energized, the resulting flexing of thermostat 23a does not affect the bake circuit. The broil element cannot be energized in the "bake" position of the selector switch because its terminal 50 is not connected to terminal 46.

Since the control device 20a does not have to be mounted in the oven wall, it may be made part of a unitary control arranged in a casing 72 (Fig. 8) including the selector switch 44 and thermostatic switch 42. The casing 72 may be secured to the range in any desired location.

In the heating systems shown in Figs. 4 and 8, the thermostat 23 of the broil element control device 20 is separate from the thermostat of the temperature regulator 42. However, since the thermostat of regulator 42 likewise responds to temperature changes in the oven, it may also be used to actuate contact 32, whereby the thermostat 23 may be eliminated. In other words, the thermostat 23 and the thermostat of regulator 42 may be combined in a single thermo-responsive means.

The control device 20b shown in Figs. 11, 12 and 13 includes a radiation-responsive thermostat instead of a bimetallic thermostat in the broil circuit. Radiation-responsive thermostats are well known in the art, one form of this type of thermostat being disclosed in an application of Lyndon W. Burch, Ser. No. 358,224, filed September 25, 1940. The radiation thermostat illustrated herein comprises a metallic tube 76 formed with longitudinal slots 77 which are diametrically opposed. The tube 76 projects inwardly through an opening in one wall of the oven 22b, the outer end of the tube being provided with a flange 78 held against an annular seal 79 surrounding the tube. As shown in Fig. 11, the tube 76 is disposed adjacent the bake element 39 in the oven and is adjusted angularly in the oven wall 22b so that the lower surface 76a between slots 77 is subjected to direct radiation from bake element 39 when the latter is energized, while the upper surface 76b is shielded from direct radiation by the surface 76a. A base member 80 made of suitable insulating material is secured to the flange 78 in any suitable manner.

Extending lengthwise through the tube 76 from its free end is a strip of bimetal 81. As shown, the free end of the tube is provided with a reduced extension 82, and one end of the strip 81 is clamped in this extension by rivets 83. At its free end, the strip 81 supports an insulated arm 84 carrying a contact 85 which coacts with a stationary contact 86 mounted on a conductor 87 secured to the base 80 in any desired manner, as by means of screws 88. On its lower face adjacent contact 85, the arm 84 is provided with an insulated stop 89 adapted to engage one side of the stationary contact 86 when the contacts are closed. The movable contact 85 is connected by a wire 90 to a terminal screw 91 on the base 80.

An oven heating system including the control device 20b is illustrated diagrammatically in Fig. 14. As there shown, the system comprises, in addition to the bake element 39, the broil element 38, selector switch 44 and oven regulator 42 connected to the current source 40, 41. When the selector switch 44 is in the "preheat" position (Fig. 14), current from terminal 40 passes through the switch of regulator 42, terminals 43 and 48, wire 94, screw 88, wire 95, bake element 39, terminals 49 and 43, and regulator 42 to the other terminal 41 of the current source. The bake element 39 is thus energized, and radiant heat therefrom passes directly to the lower surface 76a of tube 76 and heats this surface to a higher temperature than the upper surface 76b which is shielded from direct radiation. Due to the slots 77, heat cannot be conducted rapidly from the lower surface 76a to the upper surface 76b, and, accordingly, as long as the bake element 39 remains energized the lower surface 76a will remain at a higher temperature and therefore expanded relative to the upper surface 76b. The expansion of the lower surface 76a relative to the upper surface 76b causes the free end of the tube to bend upwardly, as seen in Fig. 11, with the result that the bimetal 81 is tilted counter-clockwise (Fig. 11) and moves contact 85 into engagement with contact 86. This action of tube 76 occurs rapidly upon energizing of bake element 39, so that contacts 85 and 86 are closed almost immediately. On closing of these contacts, a branch circuit is established from screw 88 through contacts 86 and 85, wire 96, broil element 38, wire 97, terminals 50 and 46, and regulator 42 to the terminal 41. The broil element 38 is therefore energized and operates with the bake element to preheat the oven rapidly to the desired temperature.

As the oven temperature rises, the bimetallic strip 81 flexes to the right, as seen in Fig. 13, and causes stop 89 to engage the adjacent side of contact 86, whereby further flexing of the bimetal is prevented and the contacts 85 and 86 are maintained in engagement. Thus, the stop 89 resists the tendency of the bimetal 81 to move contact 85 out of line with contact 86 and results in a considerable force being stored in the bimetal as it is heated.

When the oven is heated to the temperature for which the adjustment handle 45 is set, the thermostatic switch 42 opens and disconnects the heating elements from the current source. Thereupon, the lower surface 76a of tube 76 quickly cools to the temperature of the upper surface 76b, since the surface 76a is no longer subjected to direct radiation from the bake element. As a result, the free end of tube 76 moves back to its original position and tilts the bimetallic strip 81 clockwise as shown in Fig. 11, thereby disengaging contacts 85 and 86. This tilting of the strip 81 also moves the stop 89 above the top of stationary contact 86 so as to release the bimetallic strip 81. Because of the force stored in the strip 81 during the preheating operation, the strip immediately snaps to the right, as seen in Fig. 13, and moves contact 85 out of line with contact 86. Thus, when the oven cools sufficiently to cause reclosing of thermostatic switch 42, the bake element 39 is re-energized through the circuit previously traced and causes the free end of tube 76 to move upwardly again as seen in Fig. 11, but this movement of the tube cannot reclose contacts 85 and 86 for the reason that the bimetal 81 maintains contact 85 out of line with contact 86 as long as the oven is heated. Therefore, the broil element 38 cannot be re-energized unless and until the oven cools to a low temperature, such as approximately room temperature, sufficient to cause the bimetal 81 to move contact 85 back in line with contact 86.

When the selector switch 44 is moved to the "broil" position (not shown), terminals 43 and 46 are connected to terminals 47 and 50, respectively, and terminals 48 and 49 are disconnected from the current source. Accordingly, current can pass only from terminal 40 through terminals 43 and 47, wires 93 and 96, broil element 38, wire 97, terminals 50 and 46, to the other terminal 41. On movement of the selector switch to the "bake" position (not shown), terminals 43 and 46 are connected to terminals 48 and 49, respectively, and terminals 47 and 50 are disconnected from the current source, whereby the only energizing circuit is that previously described through the bake element.

It will be apparent that in the heating system of my invention the control device 20 automatically changes the connections to the broil element after the preheating cycle so as to prevent full energizing of the broil element during subsequent operation of the bake element. The control device 20 may take the form of an accessory mounted on the range independently of the selector switch and the thermostatic switch, thereby providing flexibility in the installation, or it may be made part of a single control unit including one or both of the selector and thermostatic switches. In either case, the control device is of a simple construction which includes only a few moving parts, and it does not require the use of a broil switch locking mechanism operated mechanically or directly by the usual oven thermostat.

I claim:

1. In a heating system having heating means, the combination of a thermostat movable in accordance with temperature changes adjacent said means, a member including a thermostatic means coacting with the thermostat and movable in one direction on operation of and in response to the heating means and movable in the opposite direction on interruption of said operation, a source of energy for the heating means, and energizing control means between the heating means and the source including a part operated jointly by said thermostat and member and initially held thereby in an operative position for energizing the heating means at a relatively high rate and having an inoperative position in which the heating means are energized at a reduced rate, the control means also including mechanism responsive to temperature changes adjacent the heating means for connecting and disconnecting the heating means and the source at predetermined temperatures and thereby causing operation of said member to render said part of the connecting means inoperative during subsequent operation of the heating means under control of said mechanism.

2. In a heating system including heating means disposed in a chamber, the combination of thermo-responsive means operable in accordance with changes in the chamber temperature, a member including thermostatic means coacting with said thermo-responsive means and movable in one direction on operation of and in response to the heating means and movable in the opposite direction on interruption of said operation, a source of energy for the heating means, connections between the heating means and said source for operating the heating means initially at a relatively high heating rate, said connections including a device maintained in operative condition by said member during initial operation of the heating means and movable to an inoperative position in which the heating means are operable at a reduced heating rate, and mechanism actuated by the said thermo-responsive means on heating of the chamber to a predetermined temperature for interrupting operation of the heating means at said higher rate and thereby causing actuation of said member to render the connecting device inoperative during subsequent operation of the heating means through the connections, whereby the heating means are operated at a reduced heating rate.

3. In a heating system having a source of energy and heating means operable intermittently by alternate connection to the source and disconnection therefrom, the combination of connections between the heating means and the source including control means having an operative position in which the heating means are operated through the connections at a relatively high heating rate and an inoperative position at which the heating means are operated through at least some of the connections at a lower heating rate, a thermostat connected to the control means and movable in accordance with temperature changes adjacent the heating means, and a member connected to the control means for coacting with the thermostat and movable in one direction in response to the flow of energy to the heating means upon initial operation of the heating means to maintain the control means in its operative position and movable in the opposite direction on initial disconnection of the heating means and out of the influence of energy flow to cause the control means to be maintained in its inoperative position during subsequent intermittent operation of the heating means.

4. An oven heating system comprising a broiling element and a baking element in the oven, means for electrically connecting said elements to a current source to energize the elements simultaneously, said means including a switch in the broiling element circuit having an operative position for energizing the broiling element and an inoperative position for de-energizing at least a part of the broiling element, said switch having an oven-temperature-responsive means tending to open the switch and an oven-circuit-current-responsive means tending to neutralize the effect of the first means only while energized, whereby said switch is maintained in its operative position during the initial heating of the oven by the broiling and baking circuits but is maintained in its inoperative position following initial de-energizing of said circuits.

5. In a heating system having a source of energy and heating means operable intermittently by alternate connection to the source and disconnection therefrom, the combination of connections between the heating means and the source including control means having an operative position in which the heating means are operated through the connections at a relatively high heating rate and an inoperative position in which the heating means are operated through the connections at a lower heating rate, a thermostat movable in accordance with and in response to temperature changes adjacent the heating means and acting to move said control means to its inoperative position upon a rise in the temperature adjacent the heating means, and a second thermostat responsive to initial flow of energy to the heating means independently of the temperature adjacent thereto and movable with the first thermostat and connected to the control means to maintain said control means in its operative position until initial disconnection of the heating means from the source and then causing the control means to be maintained in its inoperative position during subsequent continued operation of the heating means.

6. In a heating system having a source of energy and heating means operable intermittently by alternate connection to the source and disconnection therefrom, the combination of connections between the heating means and the source including control means having an operative position in which the heating means are operated through the connections a relatively high heating rate and an inoperative position in which the heating means are operated through the connections at a lower heating rate, a device acting to move the control means to its inoperative position upon and in response to a rise in the temperature adjacent the heating means, and an element responsive to the flow of energy to the heating means and movable with said device and tending to neutralize the effect of the device on the control means, thereby to maintain the control means in its operative position during initial operation of the heating means, said element acting in response to initial disconnection of the heating means from the source to cause the control means to be maintained in its inoperative position during subsequent continued operation of the heating means.

7. A stove oven system comprising resistance heating means associated with the oven, energizing control means connected with the heating means and adapted to be connected to a source of power and comprising thermo-responsive means movable in accordance with and in response to changes in the oven temperature, an oven-circuit-current-responsive thermostat movable on operation of the heating means independently of the oven temperature to neutralize the effect of said thermo-responsive means only while energized, and a selector switch handle movable to a "preheat" position, movable and stationary contacts, electrical leads from some of said contacts to said heating means and to said power source, and connections between said thermo-responsive means, movable contacts, handle and thermostat, the arrangement being such that on manipulation of the handle to the "preheat" position said contacts energize said heating means across the power source at a relatively high heating rate during a preheating cycle and thereafter said thermo-responsive means changes the arrangement of the contacts to terminate the preheating cycle whereupon said thermostat causes a further change in the arrangement of the contacts so that the thermo-responsive means thereafter cycles the heating means across the power source but at a reduced heating rate.

8. An oven heating system comprising a broiling element and a baking element in the oven, means for electrically connecting said elements to a current source to energize the elements simultaneously and including a member operable by current in the broil element circuit and a switch in the broil element circuit connected to the member and having an operative position for energizing the broil element and an inoperative position for deenergizing at least part of the broil element, a thermostat operable in accordance with and in response to changes in the oven temperature and acting to move the switch to its inoperative position on initial heating of the oven, said member being responsive to and operable by current in the broil element circuit to counteract the effect on the switch of the thermostat only while energized but adapted to maintain the switch in its operative position during initial heating of the oven, and mechanism for rendering said connecting means inoperative at a predetermined temperature in the oven and then rendering the connecting means operative again at a lower oven temperature, said member acting on deenergizing of the broil circuit by said mechanism to move the switch to its inoperative position and maintain it in such position while the thermostat is heated.

9. An oven heating system comprising a broiling element and a baking element in the oven, means for electrically connecting said elements to a current source to energize the elements simultaneously and including a thermostat in the broil element circuit and a switch in the broil element circuit connected to the thermostat and having an operative position for energizing the broil element and an inoperative position for deenergizing at least part of the broil element, a second thermostat operable in accordance with and in response to temperature changes in the oven and acting to move the switch to its inoperative position on initial heating of the oven, the first thermostat being responsive to the current in the broil circuit and tending to neutralize the effect of the second thermostat only while energized, thereby maintaining the switch in its operative position during initial heating of the oven, thermo-responsive means for rendering said connecting means inoperative at a predetermined temperature in the oven and then rendering the connecting means operative again at a lower oven temperature, said first thermostat acting on deenergizing of the broil circuit by said thermo-responsive means to move the switch to its inoperative position and maintain it in such position while the second thermostat is heated.

10. An oven heating system comprising a broiling element and a baking element in the oven, means for electrically connecting said elements to a current source to energize the elements simultaneously and including a thermostat in the broil element circuit and a switch in the broil element circuit connected to the thermostat and having an operative position for energizing the broil element and an inoperative position for deenergizing at least part of the broil element, a chamber separate from the oven, a heating unit in the chamber in circuit with the baking element, a thermostat in the chamber acting to move the switch to its inoperative position on initial heating of the chamber by said unit, said first thermostat being movable by current in the broil circuit to maintain the switch in its operative position during initial heating of said chamber, and mechanism for rendering said connecting means inoperative at a predetermined temperature in the oven and then rendering the connecting means operative again at a lower oven temperature, said first thermostat acting on de-energizing of the broil circuit by said mechanism to move the switch to its inoperative position and maintain it in such position while the second thermostat is heated.

11. A control device for oven and broiling circuits which comprises a switch for the broil circuit having an operative position for energizing the broil circuit and an inoperative position for at least partly de-energizing the broil circuit, a thermostat movable in accordance with temperature changes in the oven and acting in response to rising oven temperatures to move the switch to its inoperative position on heating of the oven, and a second thermostat connected into the broil circuit and operable by heat generated therein from the broil circuit current to move with the first thermostat and maintain the switch in its operative position during initial heating of the oven by said circuits, said second thermostat being operable on initial de-energizing of the circuits and upon its cooling to cause the switch to move to its inoperative position while the first thermostat remains heated by the oven heat.

12. A control device for oven baking and broiling circuits which comprises a switch for the broil circuit having an operative position for energizing the broil circuit and an inoperative position for at least partly de-energizing the broil circuit, a chamber separate from the oven, a heating unit in the chamber for connection in the baking circuit, a thermostat in the chamber acting to move the switch to its inoperative position on initial heating of the chamber in response to operation of the baking circuit with said heating unit, and a second thermostat for connection in the broil circuit and operable by heat generated therein from the broil circuit current to move with the first thermostat and maintain the switch in its operative position during initial heating of the chamber and oven by said circuits, said second thermostat being operable on initial de-energizing of the circuits to cause the switch to move to its inoperative position while the first thermostat remains heated in said chamber.

13. A control device for oven baking and broiling circuits which are provided with means for energizing and for de-energizing the circuits, which comprises a switch for the broil circuit having an operative position for energizing the broil circuit and an inoperative position for at least partly de-energizing the broil circuit, a thermostat operable in accordance with and in response to temperature changes in the oven and acting to move the switch to its inoperative position on heating of the oven, and a radiation-responsive thermostat adapted to be mounted adjacent one of the oven heating elements and operable by heat radiated from said element to counteract the action of the first thermostat on the switch and maintain the switch in its operative position during initial heating of the oven, said second thermostat being operable on initial de-energizing of the circuits by said means to cause the switch to move to its inoperative position while the first thermostat remains heated by the oven.

14. A control device for oven baking and broiling circuits which comprises a switch for the broil circuit having an operative position for energizing the broil circuit and an inoperative position for at least partly de-energizing the broil circuit, a thermostat operable in accordance with temperature changes in the oven and acting in response to rising oven temperatures to move the switch to its inoperative position on heating of the oven, a second thermostat responsive to current flow in one of said circuits, a locking device operated by the second thermostat for locking the switch in its operative position during initial heating of the oven, and means for rendering the circuits inoperative on heating of the oven to a predetermined temperature and for rendering the baking circuit operative again at a lower temperature, said second thermostat being operable in response to initial de-energizing of the circuits by said means to release the locking device whereby the switch is held in its inoperative position by the first thermostat during subsequent operation of said means.

15. A control device for oven baking and broiling circuits which comprises a switch for the broil circuit having an operative position for energizing the broil circuit and an inoperative position for at least partly de-energizing the broil circuit, a thermostat operable in accordance with temperature changes in the oven and acting to move the switch to its inoperative position on heating of the oven by said circuits, a radiation-responsive thermostat adapted to be mounted adjacent one of the oven heating elements, and a locking device operated by the second thermostat for locking the switch in its operative position during initial heating of the oven, said second thermostat being operable in response to initial de-energizing of the circuits to release the locking device whereby the switch is held in its inoperative position by the first thermostat while the oven is heated by the baking circuit.

16. An oven heating system comprising a broiling element and a baking element in the oven, electrical connections for connecting the elements to a current source, said connections including selector switch means having one position for connecting both elements to the source simultaneously and another position for connecting only one of the elements to the source, a thermostat for rendering the connections inoperative at a predetermined oven temperature and for rendering the connections operative again at a lower oven temperature, and a control device including a second thermostat responsive to the oven temperatures and a thermo-responsive mechanism in the electrical connection to the broiling element, said device being operable in said first position of the switch means to maintain the electrical connection to the broiling element until a predetermined temperature is reached in the oven and to break the connection thereto after initial de-energizing of the elements by action of the thermostat.

17. An oven heating system comprising a broiling element and a baking element in the oven, electrical connections for connecting the elements to a current source, said connections including selector switch means having one position for connecting both elements to the source simultaneously and another position for connecting only one of the elements to the source, a thermostat for rendering the connections inoperative at a predetermined oven temperature and for rendering the connections operative again at a lower oven temperature, a switch in one of said electrical connections to said broiling element having an oven-temperature-responsive means tending to open the switch and an oven-circuit-current-responsive mechanism tending to neutralize the effect of the first means only while energized, said mechanism including a pair of thermo-responsive members operable under the heating conditions in said first position of the selector switch means to maintain said switch in closed position and operable to open said switch and disconnect the broiling element after initial de-energizing of the elements by the action of the thermostat.

LYNDON WALKUP BURCH.

REFERENCES CITED

The following references are of record in the file of this patent:

UNITED STATES PATENTS

| Number | Name | Date |
|---|---|---|
| 2,076,096 | Samuels | Apr. 6, 1937 |
| 2,207,634 | Myers | July 9, 1940 |
| 2,224,983 | Parkhurst | Dec. 17, 1940 |
| 2,260,840 | Rowe | Oct. 28, 1941 |
| 2,331,535 | Candor | Oct. 12, 1943 |